March 21, 1933.  F. ELLINGSEN  1,902,697
COUPLING
Filed Nov. 7, 1932  2 Sheets-Sheet 2
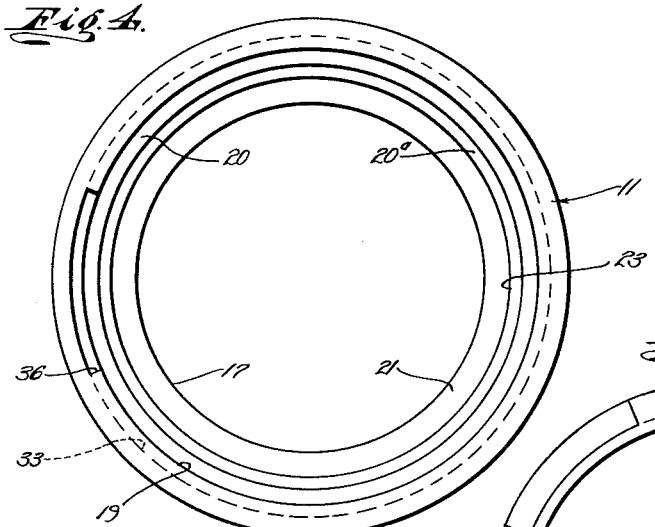
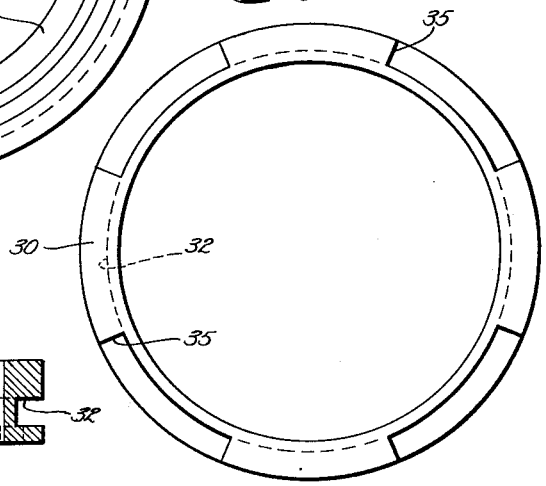
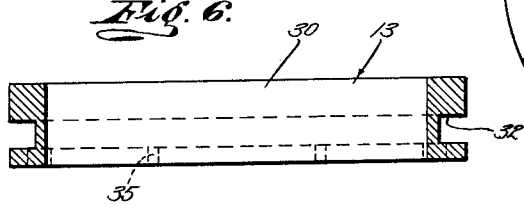
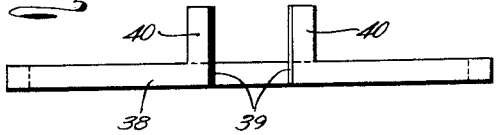
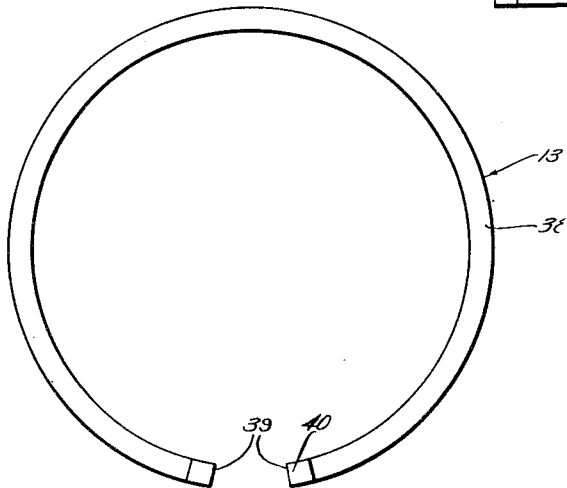
Inventor
Frank Ellingson
By
His Attorney Patented Mar. 21, 1933

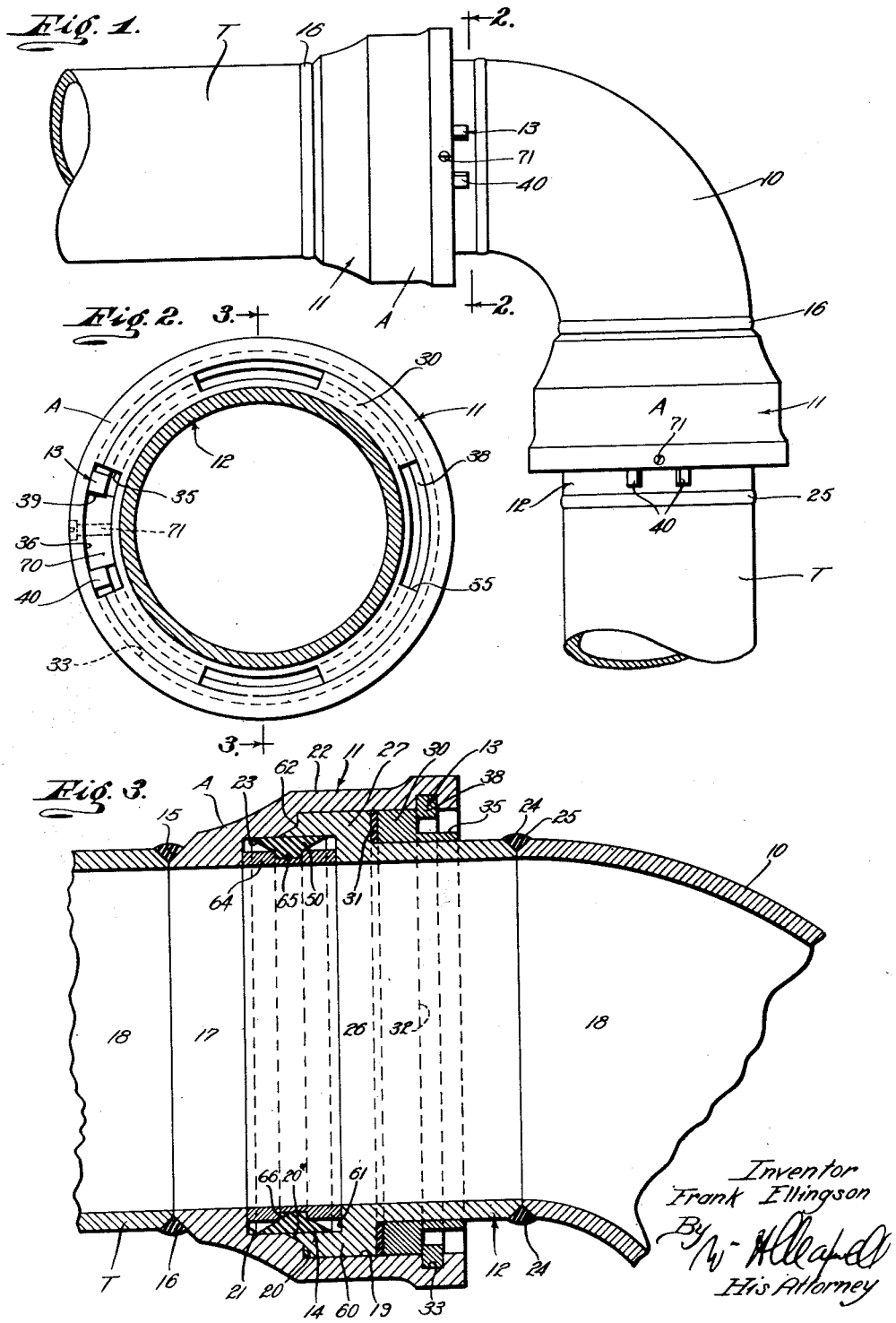

1,902,697

UNITED STATES PATENT OFFICE

FRANK ELLINGSEN, OF BREA, CALIFORNIA, ASSIGNOR TO CHIKSAN OIL TOOL COMPANY, OF FULLERTON, CALIFORNIA, A CORPORATION OF CALIFORNIA

COUPLING

Application filed November 7, 1932. Serial No. 641,570.

This invention relates to a connection or coupling and relates more particularly to a swivel connection or coupling for connecting parts of a fluid conduit, or the like. A general object of the present invention is to provide a swivel connection or coupling for connecting parts of a conduit that provides for the maximum flexibility or relative movement between the parts and that is particularly simple, compact and inexpensive of manufacture.

Rotatable or swivel connections commonly used in fluid conduits embody one or more threaded parts. Threaded parts in a swivel connection or coupling are subject to becoming loose or disconnected, and often materially complicate the structure rendering it bulky and expensive.

It is an object of this invention to provide a coupling for swivelly or rotatably connecting two parts of a fluid conduit that does not involve any threaded parts and that is not subject to failure or disconnection.

Another object of the invention is to provide a joint or coupling for swivelly connecting two parts of a conduit that may be easily and quickly assembled and disconnected.

It is another object of the invention to provide a rotatable or swivel connection of the character mentioned that embodies a minimum number of simple and inexpensive parts.

It is another object of the invention to provide a swivel connection or coupling of the character mentioned that provides for an effective fluid-tight seal between the relatively movable or rotatable members.

It is another object of the invention to provide a swivel connection of the character mentioned that may be embodied in a form that does not in any way restrict or interfere with the free flow of fluid through the conduit.

It is another object of the invention to provide a swivel connection for connecting parts of a conduit that is adapted for embodiment in conduits for handling fluid under comparatively high pressures and in conduits of large diameter or capacity.

Other objects and features of the invention will be best and more fully understood from the following detailed description of a typical form and application of the invention, throughout which description reference is had to the accompanying drawings, in which:

Fig. 1 is a side elevation of a portion of a typical conduit embodying the connection provided by the invention. Fig. 2 is an enlarged transverse detailed sectional view taken as indicated by line 2—2 on Fig. 1. Fig. 3 is an enlarged fragmentary longitudinal sectional view taken as indicated by line 3—3 on Fig. 2. Fig. 4 is an end view of one of the members of the connection. Fig. 5 is an end view of the lock bushing. Fig. 6 is a transverse sectional view of the lock bushing. Fig. 7 is a side elevation of the lock ring or part included in the connection, and Fig. 8 is an end view of the lock ring.

The swivel joint or connection provided by the present invention may be employed in various situations and in combination with various parts or structures. Throughout the following detailed disclosure, I will describe a typical embodiment of the invention in combination with certain parts of a conduit to form an improved combination and structure. It is to be understood that the invention is not to be construed as limited to the particular embodiment or application about to be described, but is to be taken as including any features or modifications that may fall within the scope of the claims.

The fluid conduit structure or portion of the conduit illustrated in Fig. 1 of the drawings includes two lengths of tubing T, an angular or curved tubular section 10, and swivel connections or joints A connecting the tubular sections T with the curved tubular section 10.

The joints or connections A provided by the invention each include generally, a member 11 to be applied to or attached to one of the parts of the conduit, a member 12 to be attached to an adjacent part of the conduit, detachable or releasable means 13 connecting the members 11 and 12 for relative rotation, and means 14 forming a fluid tight seal between the members 11 and 12. As the two connections A may be alike or identical in construction, I will proceed with a detailed description of one of them, it being understood that such description may apply to both of the connections A.

The member 11 constitutes one of the main or body parts of the connection, and is in the nature of a socket member for receiving or surrounding the major portion of the member 12. The member 11 is tubular and its outer end is adapted to be connected with one of the sections or parts of the conduit. In the particular case illustrated in the drawings, the outer end of the member 11 is welded to a tubing section T. It is to be understood that either the member 11 or the member 12 may be connected to or applied to a straight tubular part such as a tubular section T or to a curved tubular part such as the elbow 10. In Fig. 1 of the drawings, the member 11 of one connection A is connected with a straight tubular section T while the member 11 of the other connection A is attached to the elbow 10. The adjacent ends of the tubing T and the member 11 may be bevelled to provide an annular groove 15 for receiving the welding 16 that connects or attaches the member 11 to the tubing 10. The opening 17 in the member 11 is preferably of the same diameter or capacity as the opening 18 in the tubing T, as clearly illustrated in Fig. 3 of the drawings. In accordance with the invention, the outer end portion of the opening 17 is enlarged or is in the form of a socket 19 for receiving the member 12. The inner wall of bottom of the socket 19 is stepped having an outer shoulder 20 and an inner shoulder 21. The inner portion 20ª of the shoulder 20 may be tapered or beveled inwardly as clearly illustrated in Fig. 3 of the drawings. A cylindrical socket portion 23 extends inwardly from the beveled shoulder 20ª to the inner annular shoulder 21. The socket portion 23 is of less diameter than the socket 19 proper, and is of greater diameter than the inner opening 17. The exterior of the member 11 may be shaped and finished as desired or found practical.

The member 12 is adapted to be connected to or attached to a part of the conduit and extends into the member 11. In the joint or connection A illustrated in detail in Fig. 3 of the drawings, the member 12 is attached to the curved or elbow section 10 of the conduit. In accordance with the broader aspects of the invention, the member 12 may be connected with a section of the conduit in any suitable manner. In the case illustrated, the member 12 is welded to an end of the elbow section 10. The adjacent ends of the member 12 and the elbow 10 may be bevelled to provide a groove 24 for receiving the welding 25. In the typical embodiment of the invention illustrated throughout the drawings, the member 12 is a straight or cylindrical tubular member, and its opening 26 is of the same diameter and capacity as the openings 18 in the tubing sections.

The member 12 extends into the socket 19 with substantial clearance to provide an annular space for receiving or holding the releasable connecting means 13. An annular radially projecting flange 27 is provided on the inner end of the member 12. The exterior or periphery of the flange 27 rotatably fits the socket 19 and the outer end of the flange 27 is flat and radial. An annular lip 60 projects from the inner end of the flange 27 and is of the same external diameter as the flange 27. The lip 60 is of the same internal diameter as the socket portion 23 so that the inner end of the flange 27 forms an internal shoulder 61 in the member 12. The inner end 62 of the lip 60 is shaped to have bearing engagement with the shoulder 20 and the beveled shoulder portion 20ª. It will be apparent that the shoulder 20 and the inner end 62 of the lip 60 are adapted to cooperate to limit inward movement of the member 12 in the socket 19.

The means 13 for connecting the members 11 and 12 for relative rotation detachably holds or locks the member 12 in the socket 19. The detachable connecting means 13 includes a lock bushing 30 in the outer end portion of the socket 19 surrounding and rotatably passing the member 12. A suitable thrust washer 31 may be provided between the outer end of the flange 27 and the inner end of the lock bushing 30. The outer end of the lock bushing 30 may be flush with the end of the member 11 as illustrated in Fig. 3. A continuous or annular groove 32 is provided in the exterior of the lock bushing 30. An annular groove 33 is provided in the wall of the socket 19 to oppose or register with the groove 32. The registering grooves 32 and 33 may be of the same width. One or more segmental notches 35 are provided in the outer end of the lock bushing 30 to join or register with the annular groove 32. In the particular embodiment of the invention illustrated in the drawings, there is a plurality of equally spaced notches 35. A segmental notch 36 is provided in the end of the member 11 to join or communicate with the groove 33. The notch 36 may be of substantially the same length or extent as the notches 35.

The releasable connecting or lock means 13 includes a lock ring or lock part 38 cooperating with or fitting the grooves 32 and 33 to normally retain the member 12 in its proper position in the socket 19. The lock part 38 is in the nature of a split ring or spring ring as illustrated in detail in Figs. 7 and 8 of the drawings. When the lock part 38 is in its assembled or locking position, it occupies the outer groove 33 and projects into the groove 32 of the bushing 30 to lock the members 11 and 12 together against relative longitudinal movement. The ends 39 of the lock part 38 are spaced apart and outwardly, or axially projecting lugs 40 are provided on the lock part 38 adjacent its ends 39. The lock bushing 38 is positioned where one of its notches 35 is in register with the notch 36 and the lugs 40 project outwardly through the registering notches. The lugs 40 are sufficiently long to extend through the registering notches 35 and 36 and to project from the end of the socket member 11. The lock part normally bears outwardly in the groove 33 to positively lock the member 12 against outward movement in the socket 19. A movable block 70 may be provided between the ends 39 of the lock ring to prevent its accidental displacement. The block 70 may be removably held in position by a screw 71 threaded through an opening in the section 11. When it is desired to uncouple or disconnect the joint, the block 70 is first removed and the lugs 40 are engaged and moved together or toward one another to constrict the lock member 38 to be wholly within the inner groove 32. When the lock part 38 is constricted and within the groove 32, the members 11 and 12 may be readily taken apart.

The means 14 provides a fluid tight seal between the members 11 and 12. The means 14 is in the nature of a fluid pressure actuated sealing means and includes a ring 50 of rubber or other suitable packing material. The ring 50 is carried by a rigid ring or sleeve 64 arranged between the shoulders 21 and 61 and is normally in sealing engagement with the inner side of the lip 60 and the wall of the socket portion 23. The packing ring 50 has an internal tongue 65 fitting an annular groove 66 in the exterior of the ring 64. The packing ring 50 is adapted to be actuated or expanded by fluid pressure to be in tight sealing engagement with the interior of the lip 60 and the wall of the socket portion 23. In accordance with the preferred embodiment of the invention, the opposite ends of the packing ring 50 are inclined outwardly in opposite directions. The sleeve 64 fits between the shoulders 21 and 61 with clearance so that fluid under pressure is admitted behind the sleeve 64 to act on the tapered ends of the packing ring 50 and thus maintain the packing ring in sealing engagement with the interior of the lip 60 and wall of the socket portion 23. The packing ring 50 is held under compression by the fluid pressure so that it permits leakage between the shoulders 20 and 62. The opening in the sleeve 64 may be of the same diameter as the opening 26 and the opening 17.

It is believed that the utility and practicability of the joint or swivel connection provided by the present invention will be readily apparent from the foregoing detailed description. The joint or connection involves a minimum number of simple inexpensive parts and does not involve any threadedly connected elements. In assembling the joint or connection, the ring 64 carrying the expansible packing ring 50 is first arranged in the groove 22 and the member 12 may then be inserted in the socket 19. The thrust washer 31 and the lock bushing 30 may then be positioned in the socket 19 around the member 12. The lock bushing 30 is turned to a rotative position where one of its notches 35 is in register with the notch 36 in the member 11. The lock part 38 is assembled in the socket 19 together with the bushing 30 and is freed or permitted to expand into the groove 33 to lock the members 11 and 12 together. The block 70 is then arranged between the ends 39 of the lock ring 38 and secured in place by the screw 71. The connection or joint is then ready for use, providing of course, that the members 11 and 12 are connected with the adjoining ends of the sections or parts of a conduit. The connection may be easily and quickly assembled and disconnected without the use of special tools or wrenches. The connection cannot accidentally become disconnected as it does not include any threaded part or parts that might become disconnected from relative rotation of the elements of the connection. The invention may be embodied in a connection in which there is no restriction in the flow of fluid. The packing ring 50 is expanded through the action of the fluid pressure being handled and insures a fluid tight joint or connection. There can be no excess or undesirable play or looseness in the connection and the parts are not liable to become jammed or rendered inoperative through the action of or accumulations of solid matter in the fluid being handled.

Having described only a typical preferred form of invention, I do not wish to limit myself to the specific details set forth, but wish to reserve to myself any changes or variations that may appear to those skilled in the art or fall within the scope of the following claims:

Having described my invention, I claim:

1. A connection for a conduit including, two relatively rotatable members, one extending into the other, a bushing surrounding the first mentioned member in the said other member, and a removable lock part in registering recesses in the bushing and the said other member.

2. A connection for a conduit including, two relatively rotatable members, one extending into the other, packing means for sealing between the member, a bushing surrounding the first mentioned member in the said other member, and a removable split spring ring cooperating with registering recesses in the bushing and the said other member to hold the members against separation.

3. A connection for a conduit including, two relatively rotatable members, one extending into the other, parts on the members cooperating to prevent relative longitudinal movement between the members in one direction, a bushing surrounding the inner member, and a split ring cooperating with oppositely facing surfaces on the bushing and the outer member to prevent relative longitudinal movement of the members in the other direction, the ring being contractible so as to be removable from the outer end of said other member.

4. A connection for use in a conduit including, a tubular outer member, a tubular inner member extending into the outer member, means for sealing between the members, and means connecting the members for relative rotation including parts on the members cooperating to limit movement of the inner member into the outer member, a bushing rotatable on and surrounding the inner member, and a lock part cooperating with registering grooves in the bushing and outer member to prevent outward movement of the inner member.

5. A connection for use in a conduit including, a tubular outer member, a tubular inner member extending into the outer member, means for sealing between the members, and means connecting the members for relative rotation including parts on the members cooperating to limit movement of the inner member into the outer member, a bushing surrounding the inner member and rotatable relative to one of the members, and a removable lock part cooperating with oppositely facing surfaces on the bushing and the outer member to prevent outward movement of the inner member.

6. A connection for use in a conduit including, a tubular outer member, a tubular inner member extending into the outer member, means for sealing between the members, and means connecting the members for relative rotation including parts on the members cooperating to limit movement of the inner member into the outer member, a bushing surrounding the inner member and rotatable relative to one of the members, a split lock ring cooperating with registering grooves in the bushing and one of the members, and a lug on the lock ring projecting to an end of the outer member.

7. A connection for use in a conduit including, a tubular outer member, a tubular inner member extending into the outer member, means for sealing between the members, and means connecting the members for relative rotation including, shoulders on the members cooperating to limit relative movement of the members in one direction, and means connecting the members for relative rotation including a bushing surrounding the inner member and rotatable relative to one of the members, and a spring ring cooperating with grooves in the bushing and the other member.

8. A connection for use in a conduit including, a tubular outer member, a tubular inner member extending into the outer member, means for sealing between the members, and means connecting the members for relative rotation including, shoulders on the members cooperating to limit relative movement of the members in one direction, and means connecting the members for relative rotation including a bushing surrounding the inner member and rotatable relative to one of the members, a lock part cooperating with registering grooves in the bushing and the other member, and means whereby the lock part may be removed.

9. A connection for use in a conduit including, a tubular outer member, a tubular inner member extending into the outer member, means for sealing between the members, and means connecting the members for relative rotation including, shoulders on the members cooperating to limit relative movement of the members in one direction, and means connecting the members for relative rotation including a bushing surrounding the inner member and rotatable relative to one of the members, a lock part cooperating with registering grooves in the bushing and the other member, and means whereby the lock part may be removed, including lugs on the lock part projecting from an end of the outer member.

10. A connection for use in a conduit including, a tubular outer member, a tubular inner member extending into the outer member, a lip on the inner end of the inner member cooperating with a shoulder on the outer member, a packing ring sealing with the interior of the lip and the interior of the outer member, a bushing surrounding the inner member and rotatable relative to one of the members, and a lock ring cooperating with registering grooves in the bushing and the other member.

11. A connection for use in a conduit including, a tubular outer member, a tubular inner member extending into the outer member, means holding the members together for relative rotation, the members having spaced opposed shoulders, a ring between the shoulders, and a body of packing carried by the ring and having an outer surface extending lengthwise of the longitudinal axis of the connection sealing outwardly against the two members and having inclined ends free of said shoulders to be acted upon by fluid pressure in the conduit.

12. A connection for use in a conduit including, a tubular outer member, a tubular inner member extending into the outer member, means holding the member together for relative rotation, a free ring between spaced opposed parts of the members, and a body of packing carried by the ring and having a peripheral surface sealing radially outwardly against the interiors of the two members and having outwardly divergent ends free of said shoulders to be acted upon by fluid pressure in the conduit.

In witness that I claim the foregoing I have hereunto subscribed my name this 1st day of October 1932.

FRANK ELLINGSEN.